United States Patent
Li

(10) Patent No.: US 11,693,820 B2
(45) Date of Patent: Jul. 4, 2023

(54) COOPERATIVE ACCESS METHOD, SYSTEM, AND ARCHITECTURE OF EXTERNAL STORAGE

(71) Applicants: VeriSilicon Microelectronics (Chengdu) Co., Ltd., Chengdu (CN); VeriSilicon Microelectronics (Shanghai) Co., Ltd., Shanghai (CN); VeriSilicon Holdings Co., Ltd., Cayman Islands (GB); VeriSilicon Microelectronics (Nanjing) Co., Ltd., Nanjing (CN)

(72) Inventor: Yongliang Li, Chengdu (CN)

(73) Assignees: VeriSilicon Microelectronics (Chengdu) Co., Ltd., Chengdu (CN); VeriSilicon Microelectronics (Shanghai) Co., Ltd., Shanghai (CN); VeriSilicon Holdings Co., Ltd., Grand Cayman (KY); VeriSilicon Microelectronics (Nanjing) Co., Ltd., Nanjing (CN)

( * ) Notice: Subject to any disclaimer, the term of this patent is extended or adjusted under 35 U.S.C. 154(b) by 95 days.

(21) Appl. No.: 17/263,904

(22) PCT Filed: Dec. 2, 2019

(86) PCT No.: PCT/CN2019/122378
§ 371 (c)(1),
(2) Date: Jan. 28, 2021

(87) PCT Pub. No.: WO2020/186821
PCT Pub. Date: Sep. 24, 2020

(65) Prior Publication Data
US 2022/0004522 A1 Jan. 6, 2022

(30) Foreign Application Priority Data
Mar. 18, 2019 (CN) .......................... 201910201186.X

(51) Int. Cl.
*G06F 16/13* (2019.01)
*G06F 16/182* (2019.01)
(Continued)

(52) U.S. Cl.
CPC .......... *G06F 16/13* (2019.01); *G06F 16/1744* (2019.01); *G06F 16/182* (2019.01); *G06T 1/60* (2013.01); *G06T 9/00* (2013.01)

(58) Field of Classification Search
CPC .... G06F 16/13; G06F 16/1744; G06F 16/182; G06T 1/60; G06T 9/00; H04N 19/12; H04N 19/146; H04N 19/423; H04N 19/42
(Continued)

(56) References Cited

U.S. PATENT DOCUMENTS

2011/0055441 A1* 3/2011 Uchiyama ............ H04N 19/134
710/68
2017/0257513 A1* 9/2017 Matsumoto ......... G06F 12/0246

FOREIGN PATENT DOCUMENTS

CN 102929783 A * 2/2013 ............... G06F 3/12
CN 102929783 A 2/2013
(Continued)

*Primary Examiner* — Hicham Skhoun

(57) ABSTRACT

The present disclosure provides a cooperative access method, system, and architecture of an external storage. The method includes: pre-storing image compression configuration information and image decompression configuration information corresponding to an access address of a read and write operation of an image processing device; compressing an image data and storing the compressed data to an external storage based on an access address of a write operation of an image processing device and the image compression configuration information; decompressing the compressed data and sending the decompressed data to the image processing device based on an access address of a read operation of the image processing device and the image decompression
(Continued)

configuration information, which compresses the image data and stores it in the external storage, decompresses compressed data and returns it to the image processing device, thereby reducing the space requirements for external storage, which improves the overall system performance.

10 Claims, 2 Drawing Sheets

(51) Int. Cl.
     *G06F 16/174*    (2019.01)
     *G06T 1/60*      (2006.01)
     *G06T 9/00*      (2006.01)

(58) Field of Classification Search
     USPC .......................................................... 707/705
     See application file for complete search history.

(56) References Cited

FOREIGN PATENT DOCUMENTS

| | | | | | |
|---|---|---|---|---|---|
| CN | 105530402 A | * | 4/2016 | ............... | G06F 3/12 |
| CN | 105530402 A | | 4/2016 | | |

* cited by examiner

COOPERATIVE ACCESS METHOD, SYSTEM, AND ARCHITECTURE OF EXTERNAL STORAGE

CROSS REFERENCE TO RELATED APPLICATION

This is a Sect. 371 National Stage of PCT International Application No. PCT/CN2019/122378, filed on 2 Dec. 2019, which claims priority of a Chinese Patent Application No. 201910201186X filed on 18 Mar. 2019, the contents of which hereby being incorporated by reference in its entirety for all purposes.

BACKGROUND

Field of Disclosure

The present disclosure relates to the technical field of external storage access, in particular, to a cooperative access method, system, and architecture of an external storage.

Description of Related Arts

With the increasing integration of chips, the demand for chips for external storage is also increasing. The capacity and bandwidth of external storage have become an important part affecting system performance. Therefore, it is necessary to continuously optimize and balance the access of each component to the external storage to improve the performance of the entire system. At the same time, in high-performance systems, each component often requires great data throughput to meet its processing speed. Therefore, the capacity and bandwidth of external storage have become one of the bottlenecks that limit system performance.

With the development of artificial intelligence algorithms and machine vision, mobile devices in the existing technology have a large number of sensors working together and require powerful image computing performance. This places higher demands on the external storage of the chips. Due to the large amount of data throughput required during image processing, how to complete complex operations using limited external storage and obtain higher image processing speed has become a difficult and important issue in the field of image computing chips.

SUMMARY

The present disclosure provides a cooperative access method, system, and architecture of an external storage. The cooperative access architecture compresses the image data and then stores it in the external storage, decompresses the compressed data, and then returns it to the image processing device, thereby reducing the space requirements for external storage, which improves the overall system performance.

The present disclosure provides a cooperative access architecture of an external storage, including: at least one configuration register in one-to-one correspondence with an access address of a read and write operation of an image processing device, to store image compression configuration information and image decompression configuration information corresponding to the access address; an image compression module coupled with the image processing device, the configuration register, and an external storage, to compress an image data and store the compressed data to the external storage based on an access address of a write operation of the image processing device and the image compression configuration information; an image decompression module coupled with the image processing device, the configuration register, and the external storage, to decompress the compressed data and send the decompressed data to the image processing device based on an access address of a read operation of the image processing device and the image decompression configuration information.

In an embodiment of the present disclosure, the image compression module includes a first address resolution controller, an image compression processor, and a first address converter.

The first address resolution controller is coupled with the image processing device and the configuration register to obtain corresponding image compression configuration information from the configuration register according to the access address of the write operation.

The image compression processor is coupled with the first address resolution controller to compress the image data according to the image compression configuration information to obtain the compressed data.

The first address converter is coupled with the image compression processor and the external storage to convert the access address to a mapped address and write the compressed data to the mapped address of the external storage.

In an embodiment of the present disclosure, the image compression processor first uses a lossless compression algorithm for compression; when a compression rate is less than a target compression rate, lossy compression is performed.

In an embodiment of the present disclosure, the image decompression module includes a second address resolution controller, a second address converter, and an image decompression processor.

The second address resolution controller is coupled with the image processing device and the configuration register to obtain corresponding image decompression configuration information from the configuration register according to the access address of the read operation.

The second address converter is coupled with the external storage and the second address resolution controller to convert the access address to a mapped address and read the compressed data corresponding to the mapped address from the external storage.

The image decompression processor is coupled with the second address converter and the image processing device to decompress the compressed data and send the obtained decompressed data to the image processing device based on the image decompression configuration information.

In an embodiment of the present disclosure, the image decompression processor first judges whether the compressed data has undergone lossy compression, and then determines a decompression algorithm based on the judgment result.

In an embodiment of the present disclosure, the image compression configuration information frame image data format, a compression unit size, a frame image storage space size, and a target compression ratio; the image decompression configuration information comprises the frame image data format, the compression unit size, the frame image storage space size, and the target compression ratio.

The present disclosure further provides a cooperative access system of an external storage, including the above cooperative access architecture of the external storage, the image processing device, and the external storage; both the image processing device and the external storage are coupled with the cooperative access architecture of the external storage.

The present disclosure further provides a cooperative access method of an external storage, including: pre-storing image compression configuration information and image decompression configuration information corresponding to an access address of a read and write operation of an image processing device; compressing an image data and storing the compressed data to an external storage based on an access address of a write operation of an image processing device and the image compression configuration information; and decompressing the compressed data and sending the decompressed data to the image processing device based on an access address of a read operation of the image processing device and the image decompression configuration information.

In an embodiment of the present disclosure, the compressing of the image data and the storing of the obtained compressed data to the external storage includes: obtaining corresponding image compression configuration information according to the access address of the write operation; compressing the image data according to the image compression configuration information to obtain the compressed data; and converting the access address to a mapped address and writing the compressed data to the mapped address of the external storage.

In an embodiment of the present disclosure, the decompressing of the compressed data and the sending of the obtained decompressed data to the image processing device includes: obtaining corresponding image decompression configuration information according to the access address of the read operation; converting the access address to a mapped address and reading the compressed data corresponding to the mapped address from the external storage; and decompressing the compressed data and sending the obtained decompressed data to the image processing device based on the image decompression configuration information.

As described above, the cooperative access method, system, and architecture of the external storage of the present disclosure have the following beneficial effects:

(1) The cooperative access architecture compresses the image data and then stores it in the external storage, decompresses the compressed data, and then returns it to the image processing device, thereby reducing the space requirements for external storage.

(2) The present disclosure can meet the requirements of high-performance systems by using a low-capacity external storage, thereby reducing the overall system cost and avoiding the additional chip area caused by expanding the capacity of external storage.

(3) No need to change the original system structure, the connection structure is simple and has strong applicability.

(4) While saving the requirements for the capacity of the external storage in the system, it also reduces the requirements for the bandwidth of the external storage, thereby further improving system performance.

DESCRIPTION OF REFERENCE NUMERALS

Figure 1:
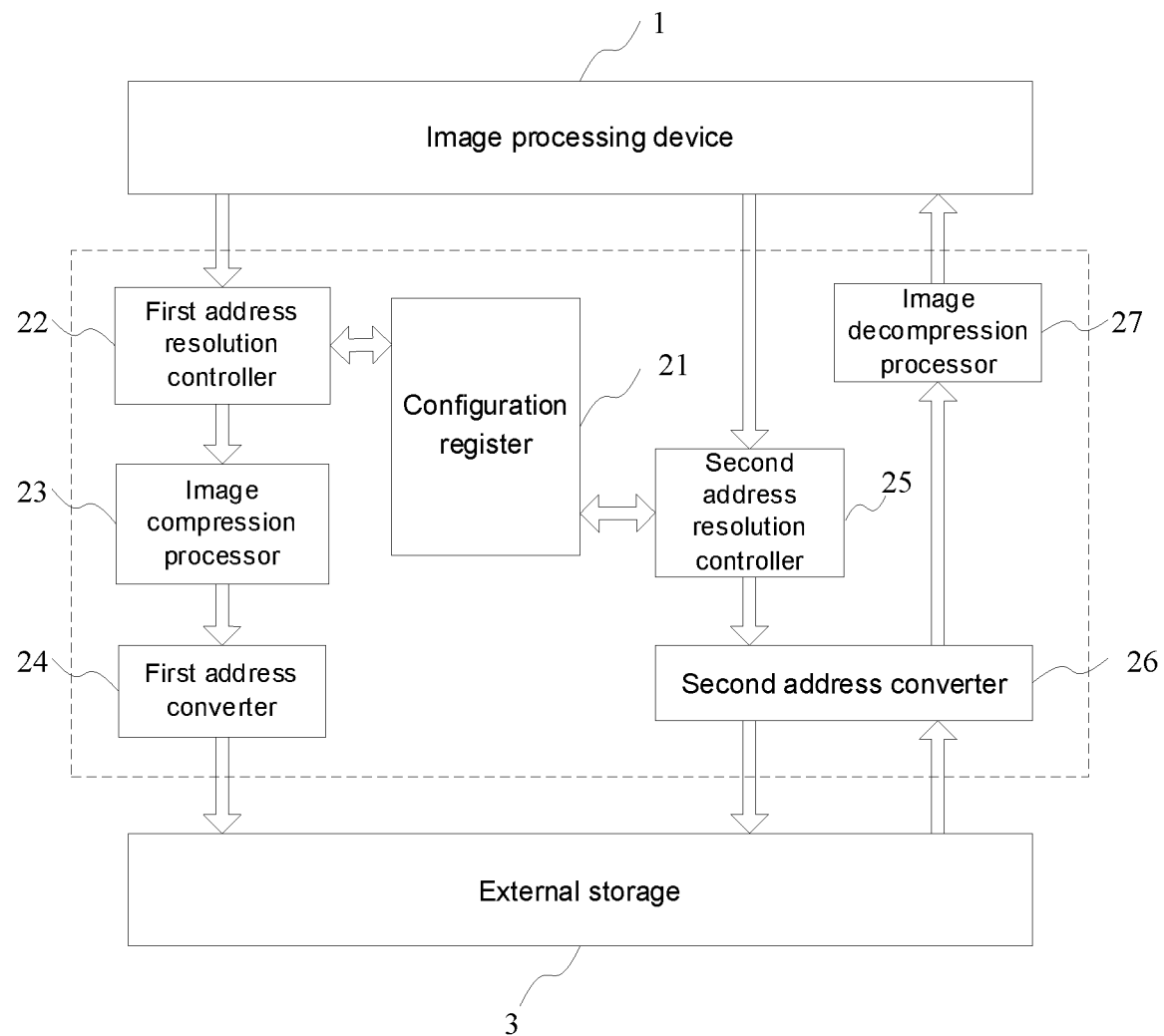
FIG. 1 shows a schematic view of a cooperative access system of an external storage according to an embodiment of the present disclosure.

1 Image processing device
2 Cooperative access architecture of external storage
21 Configuration register
22 First address resolution controller
23 Image compression processor
24 First address converter
25 Second address resolution controller
26 Second address converter
27 Image decompression processor
3 External storage

DETAILED DESCRIPTION OF THE PREFERRED EMBODIMENTS

The embodiments of the present disclosure will be described below through exemplary embodiments. Those skilled in the art can easily understand other advantages and effects of the present disclosure according to contents disclosed by the specification. The present disclosure can also be implemented or applied through other different exemplary embodiments. Various modifications or changes can also be made to all details in the specification based on different points of view and applications without departing from the spirit of the present disclosure.

It needs to be stated that the drawings provided in the following embodiments are just used for schematically describing the basic concept of the present disclosure, thus only illustrating components only related to the present disclosure and are not drawn according to the numbers, shapes, and sizes of components during actual implementation, the configuration, number and scale of each component during actual implementation thereof may be freely changed, and the component layout configuration thereof may be more complicated.

The cooperative access method, system, and architecture of the external storage of the present disclosure compresses the image data and then stores it in the external storage, decompresses the compressed data and then returns it to the image processing device based on the cooperative access architecture, thereby reducing the space and bandwidth requirements for external storage through the cooperative access architecture, which improves the overall system performance and is highly practical.

As shown in FIG. 1, in an embodiment, the cooperative access system of an external storage of the present disclosure includes a cooperative access architecture 2 of the external storage, an image processing device 1 and an external storage 3. The image processing device 1 and the external storage 3 are both coupled with the cooperative access architecture 2. The cooperative access architecture 2 realizes data reading and writing between the image processing device 1 and the external storage 3.

Specifically, the cooperative access architecture 2 of the external storage includes at least one configuration register 21, an image compression module, and an image decompression module.

The configuration register 21 is in one-to-one correspondence with the access address of the reading and writing operation of the image processing device 1, and is used to store image compression configuration information and image decompression configuration information corresponding to the access address. Specifically, one access address corresponds to one configuration register. The configuration register 21 stores image compression configuration information and image decompression configuration information of the image corresponding to the access address. When the image processing device 1 simultaneously reads and writes multiple frames of images, a corresponding number of configuration registers need to be configured corresponding to multiple access addresses. The configuration register 21 is pre-configured by the external processor of the system.

The image compression module is coupled with the image processing device 1, the configuration register 21, and the external storage 3. The image compression module is used to compress image data and store the compressed data to the external storage 3 based on the access address for the write operation of the image processing device 1 and the image compression configuration information. Specifically, the image compression module compresses the image data that needs to be written to the external storage 3 by the image processing device 1 and then writes to the external storage 3, thereby reducing the space and bandwidth requirements for the external storage 3.

In an embodiment of the present disclosure, the image compression module includes a first address resolution controller 22, an image compression processor 23, and a first address converter 24.

The first address resolution controller 22 is coupled with the image processing device 1 and the configuration register 21, and is used to obtain corresponding image compression configuration information from the configuration register according to the access address of the write operation. Specifically, when the image processing device 1 needs to perform a write operation to the external storage 3, the first address resolution controller 22 resolves the access address of the write operation of the image processing device 1, and obtains corresponding image compression configuration information in the configuration register 21 according to the address resolution result. Preferably, the image compression configuration information includes a frame image data format (such as ARGB, YUV, etc.), a compression unit size, a frame image storage space size, and a target compression ratio.

The image compression processor 23 is coupled with the first address resolution controller 22, and is used to compress the image data according to the image compression configuration information to obtain the compressed data. Specifically, the image data to be written by the image processing device 1 and the image compression configuration information are transmitted to the image compression processor 23 together, and the image compression processor 23 compresses the image data according to the image compression configuration information to obtain the compressed data. Preferably, the image compression processor 23 accumulates the corresponding data amount according to the configured compression unit size, and compresses the image data in a multi-stage pipeline. When sufficient data is obtained, pipeline compression is performed. In an embodiment of the present disclosure, the image compression processor 23 first performs compression using a lossless compression algorithm. When the compression rate is less than the target compression rate, lossy compression is performed. Specifically, the image compression processor 23 preferentially uses a lossless compression algorithm for compression according to the data format of the image data. After the lossless compression ends, the compression rate is calculated and compared with the target compression rate. If the compression rate reaches the target compression rate, the compression operation is stopped. If the compression rate does not reach the target compression rate, the compressed data continues to be lossily compressed, and the compression rate is increased to the target compression rate while preserving as much original data information as possible.

The first address converter 24 is coupled with the image compression processor 23 and the external storage 3, and is used to convert the access address to a mapped address and write the compressed data to the mapped address of the external storage 3. Specifically, after obtaining the compressed data, the first address converter 24 performs mapping conversion on the access address to obtain a mapped address, and writes the compressed data to the mapped address of the external storage 3. The mapped address is equal to the offset address times the target compression rate plus the start address of the image frame.

The image decompression module is coupled with the image processing device 1, the configuration register 21, and the external storage 3. The image decompression module is used to decompress the compressed data and send the obtained decompressed data to the image processing device 1 based on the access address of the read operation of the image processing device 1 and the image decompression configuration information. Specifically, the image decompression module decompresses the compressed data in the external storage 3 and reads the decompressed data according to the read operation request of the image processing device 1, thereby reducing the space and bandwidth requirements for the external storage 3.

In an embodiment of the present disclosure, the image decompression module includes a second address resolution controller 25, an image decompression processor 27, and a second address converter 26.

The second address resolution controller 25 is coupled with the image processing device 1 and the configuration register 21, and is used to obtain corresponding image decompression configuration information from the configuration register 21 according to the access address of the read operation. Specifically, when the image processing device 1 needs to perform a read operation to the external storage 3, the second address resolution controller 25 resolves the access address of the read operation of the image processing device 1, and obtains corresponding image decompression configuration information in the configuration register 21 according to the address resolution result. Preferably, the image decompression configuration information includes a frame image data format (such as ARGB, YUV, etc.), a compression unit size, a frame image storage space size, and a target compression ratio.

The second address converter 26 is coupled with the external storage 3 and the second address resolution controller 25, and is used to convert the access address to a mapped address and read the compressed data corresponding to the mapped address from the external storage 3. Specifically, the second address converter 26 stores the image decompression configuration information transmitted from the second address resolution controller 25 in its register. At the same time, the second address converter 26 converts the access address into a mapped address according to the conversion mapping relationship between the access address and the mapped address, and requests the external storage 3 for compressed data stored in the mapped address. Finally, the second address converter 26 transmits the obtained compressed data and image decompression configuration information to the image decompression processor 27 together.

The image decompression processor 27 is coupled with the second address converter 26 and the image processing device 1, and is used to decompress the compressed data according to the image decompression configuration information, and send the obtained decompressed data to the image processing device 1. In an embodiment of the present disclosure, the image decompression processor 27 first judges whether the compressed data has undergone lossy compression, then determines a corresponding decompression algorithm based on the judgment result, and then performs pipeline decompression on the compressed data based on the decompression algorithm, and send the obtained decompressed data to the image processing device 1.

Figure 2:
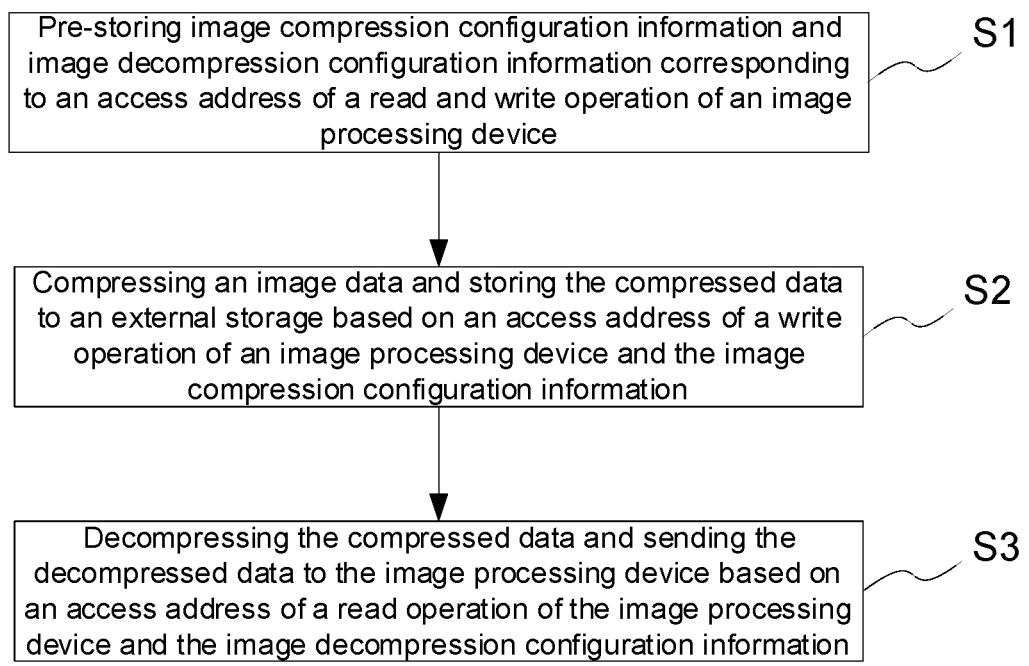
FIG. 2 shows a flow chart of a cooperative access method of an external storage according to an embodiment of the present disclosure.

As shown in FIG. 2, in an embodiment, a cooperative access method of an external storage of the present disclosure is applied to the cooperative access system of the external storage described above. The method specifically includes the following operations:

Operation S1: pre-storing image compression configuration information and image decompression configuration information corresponding to an access address of a read and write operation of an image processing device.

Specifically, the external processor pre-configures image compression information and image decompression information based on the access address of the read and write operation of the image processing device, then pre-stores the obtained image compression configuration information and image decompression configuration information in a configuration register. It should be noted that one configuration register corresponds to one image access address.

Operation S2: compressing an image data and storing the compressed data to an external storage based on an access address of a write operation of an image processing device and the image compression configuration information.

Specifically, the image compression module obtains corresponding image compression configuration information based on the access address of the write operation of the image processing device, and compresses the image data that needs to be written to the external storage based on the image compression configuration information, and stores the compressed data to the external storage.

In an embodiment of the present disclosure, the compressing of the image data and the storing of the obtained compressed data to the external storage includes the following operations:

21) Obtaining corresponding image compression configuration information according to the access address of the write operation.

Specifically, the access address is resolved based on the first address resolution controller, and the corresponding image compression configuration information is obtained in the configuration register according to the resolution result.

22) Compressing the image data according to the image compression configuration information to obtain the compressed data.

Specifically, the image compression processor performs pipeline image compression based on the information after the image compression configuration to obtain compressed data.

23) Converting the access address to a mapped address and writing the compressed data into the mapped address of the external storage.

Specifically, the access address of the image processing device is converted to the mapped address of the external storage based on the first address converter, and then the compressed data is written to the mapped address of the external storage, thereby completing the compression and storage of the image data.

Operation S3: decompressing the compressed data and sending the decompressed data to the image processing device based on an access address of a read operation of the image processing device and the image decompression configuration information.

Specifically, the image decompression module obtains corresponding image decompression configuration information based on the access address of the read operation of the image processing device, decompresses the compressed data written in the external storage based on the image decompression configuration information, and sends the decompressed data to the image processing device.

In an embodiment of the present disclosure, the decompressing of the compressed data and the sending of the obtained decompressed data to the image processing device includes the following operations:

31) Obtaining corresponding image decompression configuration information according to the access address of the read operation.

Specifically, the access address is resolved based on the second address resolution controller, and the corresponding image decompression configuration information is obtained in the configuration register according to the resolution result.

32) Converting the access address to a mapped address and reading the compressed data corresponding to the mapped address from the external storage.

Specifically, the access address of the image processing device is converted to the mapped address of the external storage based on the second address converter, the compressed data on the mapped address is read from the external storage, and the compressed data and the image decompression configuration information are sent to the image decompression processor.

33) Decompressing the compressed data and sending the decompressed data to the image processing device based on the image decompression configuration information.

In summary, the cooperative access method, system, and architecture of the external storage of the present disclosure compresses the image data and then stores it in the external storage, decompresses the compressed data and then returns it to the image processing device based on the cooperative access architecture, thereby reducing the space requirements for external storage. The present disclosure can meet the requirements of high-performance systems by using a low-capacity external storage, thereby reducing the overall system cost and avoiding the additional chip area caused by expanding the capacity of external storage. The original system structure does not need to be changed, the connection structure is simple and has strong applicability. The requirements for the capacity of the external storage in the system are saved, and the requirements for the bandwidth of the external storage are reduced, thereby further improving system performance. Therefore, the present disclosure effectively overcomes various shortcomings in the existing technology and has high industrial utilization value.

The above-mentioned embodiments are just used for exemplarily describing the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those skilled in the art without departing from the spirit and scope of the disclosure will be covered by the appended claims.

I claim:

1. A cooperative access architecture of an external storage, comprising:
    at least one configuration register in one-to-one correspondence with an access address of a read and write operation of an image processing device, to store image compression configuration information and image decompression configuration information corresponding to the access address;
    an image compression module coupled with the image processing device, the configuration register, and an external storage, to compress an image data and store the compressed data to the external storage based on an access address of a write operation of the image processing device and the image compression configuration information; and
    an image decompression module coupled with the image processing device, the configuration register, and the external storage, to decompress the compressed data and send the decompressed data to the image processing device based on an access address of a read operation of the image processing device and the image decompression configuration information.

2. The cooperative access architecture of an external storage according to claim 1, wherein the image compression module comprises:
    a first address resolution controller coupled with the image processing device and the configuration register to obtain corresponding image compression configuration information from the configuration register according to the access address of the write operation;
    an image compression processor coupled with the first address resolution controller to compress the image data according to the image compression configuration information to obtain the compressed data; and
    a first address converter coupled with the image compression processor and the external storage to convert the access address to a mapped address and write the compressed data to the mapped address of the external storage.

3. The cooperative access architecture of an external storage according to claim 2, wherein the image compression processor first uses a lossless compression algorithm for compression; when a compression rate is less than a target compression rate, lossy compression is performed.

4. The cooperative access architecture of an external storage according to claim 1, wherein the image decompression module comprises:
    a second address resolution controller coupled with the image processing device and the configuration register to obtain corresponding image decompression configuration information from the configuration register according to the access address of the read operation;
    a second address converter coupled with the external storage and the second address resolution controller to convert the access address to a mapped address and read the compressed data corresponding to the mapped address from the external storage; and
    an image decompression processor coupled with the second address converter and the image processing device to decompress the compressed data and send the obtained decompressed data to the image processing device based on the image decompression configuration information.

5. The cooperative access architecture of an external storage according to claim 4, wherein the image decompression processor first judges whether the compressed data has undergone lossy compression, and then determines a decompression algorithm based on the judgment result.

6. The cooperative access architecture of an external storage according to claim 1, wherein the image compression configuration information comprises a frame image data format, a compression unit size, a frame image storage space size, and a target compression ratio; the image decompression configuration information comprises the frame image data format, the compression unit size, the frame image storage space size, and the target compression ratio.

7. A cooperative access system of an external storage, comprising the cooperative access architecture of the external storage according to claims 1, an image processing device, and an external storage;
    both the image processing device and the external storage are coupled with the cooperative access architecture of the external storage.

8. A cooperative access method of an external storage, comprising:
    pre-storing image compression configuration information and image decompression configuration information corresponding to an access address of a read and write operation of an image processing device;
    compressing an image data and storing the compressed data to an external storage based on an access address of a write operation of an image processing device and the image compression configuration information; and
    decompressing the compressed data and sending the decompressed data to the image processing device based on an access address of a read operation of the image processing device and the image decompression configuration information.

9. The cooperative access method of an external storage according to claim 8, wherein the compressing of the image data and the storing of the obtained compressed data to the external storage comprises:
    obtaining corresponding image compression configuration information according to the access address of the write operation;
    compressing the image data according to the image compression configuration information to obtain the compressed data; and
    converting the access address to a mapped address and writing the compressed data to the mapped address of the external storage.

10. The cooperative access method of an external storage according to claim 8, wherein the decompressing of the compressed data and the sending of the obtained decompressed data to the image processing device comprises:
    obtaining corresponding image decompression configuration information according to the access address of the read operation;
    converting the access address to a mapped address and reading the compressed data corresponding to the mapped address from the external storage; and
    decompressing the compressed data and sending the obtained decompressed data to the image processing device based on the image decompression configuration information.

* * * * *